United States Patent
Jadunandan et al.

(10) Patent No.: US 9,210,600 B1
(45) Date of Patent: Dec. 8, 2015

(54) WIRELESS NETWORK PERFORMANCE ANALYSIS SYSTEM AND METHOD

(75) Inventors: Kevin Jadunandan, Palm Bay, FL (US); Shane A. Lobo, Elkton, FL (US); Drew A. Shinholster, Jr., Maitland, FL (US); Jeff Stamborski, Casselberry, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 45 days.

(21) Appl. No.: 13/607,485

(22) Filed: Sep. 7, 2012

(51) Int. Cl.
*H04W 24/08* (2009.01)
*H04W 28/02* (2009.01)
*H04W 72/12* (2009.01)
*H04W 16/00* (2009.01)

(52) U.S. Cl.
CPC .............. *H04W 24/08* (2013.01); *H04W 16/00* (2013.01); *H04W 28/02* (2013.01); *H04W 72/12* (2013.01)

(58) Field of Classification Search
USPC ................. 370/370, 328–329, 338; 455/452, 455/452.1, 423, 424, 405; 709/202; 715/204
See application file for complete search history.

(56) References Cited

U.S. PATENT DOCUMENTS

| | | | |
|---|---|---|---|
| 5,914,668 A | | 6/1999 | Chavez, Jr. et al. |
| 5,987,099 A | * | 11/1999 | O'Neill et al. ................. 455/436 |
| 6,115,610 A | * | 9/2000 | Goetz et al. .................... 455/450 |
| 6,216,002 B1 | * | 4/2001 | Holmring ...................... 455/436 |
| 6,539,221 B1 | * | 3/2003 | Vasudevan et al. ........... 455/423 |
| 6,587,686 B1 | * | 7/2003 | Cuffaro et al. ................ 455/423 |
| 6,745,011 B1 | * | 6/2004 | Hendrickson et al. ..... 455/67.11 |
| 6,842,620 B2 | * | 1/2005 | Smith et al. ................. 455/456.1 |
| 7,236,767 B1 | * | 6/2007 | Cankaya et al. ............... 455/405 |
| 7,237,767 B2 | * | 7/2007 | Sakakibara et al. ......... 261/36.1 |
| 7,454,002 B1 | | 11/2008 | Gardner et al. |
| 7,693,042 B1 | * | 4/2010 | Wei ............................... 370/216 |
| 7,778,591 B1 | | 8/2010 | Van Hoff et al. |
| 7,903,625 B1 | * | 3/2011 | Srinivas et al. ............... 370/338 |
| 8,005,644 B1 | * | 8/2011 | Evans et al. ................... 702/183 |
| 8,145,186 B1 | * | 3/2012 | Vaughan ....................... 455/405 |
| 8,145,560 B2 | | 3/2012 | Kulkarni et al. |
| 8,170,547 B1 | * | 5/2012 | Bhan et al. .................... 455/424 |
| 8,229,415 B1 | * | 7/2012 | Chen et al. ................. 455/422.1 |
| 8,423,035 B1 | * | 4/2013 | Dinan et al. .................. 455/450 |

(Continued)

OTHER PUBLICATIONS

Ford, Justin L. et al., Patent Application entitled "System and Method for Evaluating Operational Integrity of a Radio Access Network", filed Jan. 30, 2014, U.S. Appl. No. 14/169,046.

(Continued)

*Primary Examiner* — Edan Orgad
*Assistant Examiner* — Steven Willmore (57) ABSTRACT

A system for managing a cellular wireless communication network. The system comprises a data store that comprises cellular wireless communication performance metrics, a computer, and an application that is stored in a non-transitory memory of the computer and executed by the computer. The application receives a selection of base transceiver stations, retrieves metrics associated with the selected base transceiver stations from the data store, analyzes the metrics associated with the selected base transceiver stations, identifies a low usage base transceiver station that is one of the selected base transceiver stations, wherein the low usage base transceiver station is associated with a usage that is less than a predefined usage threshold, determines an average of an at least one metric based on the metrics of the selected base transceiver stations excluding the low usage base transceiver station, and transmits the average of the at least one metric.

19 Claims, 4 Drawing Sheets

(56) References Cited

U.S. PATENT DOCUMENTS

| | | | |
|---|---|---|---|
| 8,570,955 B2 * | 10/2013 | Viorel et al. | 370/329 |
| 8,600,384 B1 * | 12/2013 | Moreno et al. | 455/436 |
| 8,627,125 B2 | 1/2014 | Kashyap | |
| 8,880,600 B2 | 11/2014 | Lento et al. | |
| 8,966,055 B2 | 2/2015 | Mittal et al. | |
| 2001/0036825 A1 * | 11/2001 | Martin | 455/424 |
| 2002/0068559 A1 * | 6/2002 | Sharma et al. | 455/423 |
| 2002/0069037 A1 * | 6/2002 | Hendrickson et al. | 702/186 |
| 2002/0177448 A1 * | 11/2002 | Moran et al. | 455/456 |
| 2003/0078055 A1 * | 4/2003 | Smith et al. | 455/456 |
| 2003/0100317 A1 * | 5/2003 | Kaplan et al. | 455/456 |
| 2003/0161265 A1 * | 8/2003 | Cao et al. | 370/229 |
| 2004/0127224 A1 * | 7/2004 | Furukawa et al. | 455/446 |
| 2005/0014492 A1 * | 1/2005 | Kang et al. | 455/418 |
| 2005/0064820 A1 * | 3/2005 | Park et al. | 455/67.11 |
| 2005/0096842 A1 * | 5/2005 | Tashiro | 701/210 |
| 2005/0192001 A1 * | 9/2005 | Samuel | 455/423 |
| 2006/0183471 A1 * | 8/2006 | Samuel et al. | 455/423 |
| 2006/0217116 A1 * | 9/2006 | Cassett et al. | 455/423 |
| 2007/0004394 A1 * | 1/2007 | Chu et al. | 455/422.1 |
| 2007/0026886 A1 * | 2/2007 | Vincent | 455/522 |
| 2007/0105583 A1 * | 5/2007 | Gerlach | 455/522 |
| 2007/0288480 A1 * | 12/2007 | Caplan et al. | 707/10 |
| 2008/0045245 A1 * | 2/2008 | Billmaier et al. | 455/457 |
| 2008/0152104 A1 * | 6/2008 | Keeler et al. | 379/112.01 |
| 2008/0215355 A1 * | 9/2008 | Herring et al. | 705/1 |
| 2008/0219365 A1 * | 9/2008 | Viorel et al. | 375/260 |
| 2008/0233936 A1 * | 9/2008 | Rajan et al. | 455/417 |
| 2009/0054056 A1 | 2/2009 | Gil | |
| 2009/0055719 A1 * | 2/2009 | Cossins et al. | 715/204 |
| 2009/0075648 A1 * | 3/2009 | Reed et al. | 455/424 |
| 2009/0111462 A1 | 4/2009 | Krinsky et al. | |
| 2009/0161850 A1 * | 6/2009 | Raymer et al. | 379/112.01 |
| 2009/0164551 A1 * | 6/2009 | Oesterling et al. | 709/202 |
| 2009/0248711 A1 * | 10/2009 | Martinez et al. | 707/100 |
| 2009/0275335 A1 * | 11/2009 | Jalloul et al. | 455/437 |
| 2009/0286526 A1 * | 11/2009 | Matsunaga | 455/421 |
| 2009/0296674 A1 * | 12/2009 | Ekl et al. | 370/338 |
| 2010/0015926 A1 * | 1/2010 | Luff | 455/67.13 |
| 2010/0099405 A1 * | 4/2010 | Brisebois et al. | 455/434 |
| 2010/0151920 A1 * | 6/2010 | Song et al. | 455/574 |
| 2010/0234031 A1 * | 9/2010 | Lidron | 455/446 |
| 2011/0143748 A1 * | 6/2011 | Shah et al. | 455/424 |
| 2011/0166986 A1 * | 7/2011 | Graham et al. | 705/38 |
| 2011/0201317 A1 | 8/2011 | Karandikar et al. | |
| 2011/0275364 A1 * | 11/2011 | Austin et al. | 455/423 |
| 2011/0313695 A1 * | 12/2011 | Houston et al. | 702/62 |
| 2011/0320588 A1 * | 12/2011 | Raleigh | 709/224 |
| 2012/0058759 A1 * | 3/2012 | Lundborg et al. | 455/424 |
| 2012/0096065 A1 * | 4/2012 | Suit et al. | 709/202 |
| 2012/0120078 A1 * | 5/2012 | Hubbard | 345/440.2 |
| 2012/0295618 A1 * | 11/2012 | Ahmavaara et al. | 455/435.1 |
| 2013/0052019 A1 * | 2/2013 | Ions et al. | 416/174 |
| 2013/0053019 A1 * | 2/2013 | Schilling | 455/422.1 |
| 2013/0072222 A1 | 3/2013 | Weill et al. | |
| 2013/0091452 A1 * | 4/2013 | Sorden et al. | 715/771 |
| 2013/0157652 A1 * | 6/2013 | Khaitan et al. | 455/422.1 |
| 2013/0331082 A1 | 12/2013 | Topaltzas et al. | |
| 2013/0331114 A1 * | 12/2013 | Gormley et al. | 455/452.1 |
| 2014/0003389 A1 * | 1/2014 | Wang et al. | 370/331 |
| 2014/0022918 A1 * | 1/2014 | Guo et al. | 370/252 |
| 2014/0078992 A1 * | 3/2014 | Khandekar et al. | 370/329 |
| 2014/0177430 A1 * | 6/2014 | Hassett | 370/216 |

OTHER PUBLICATIONS

Jadunandan, Kevin, et al., Patent Application entitled, "Wireless Cell Tower Performance Analysis System and Method" filed Dec. 19, 2013, U.S. Appl. No. 14/135,574.

FAIPP Pre-Interview Communication dated Apr. 21, 2015, U.S. Appl. No. 14/135,574, filed Dec. 19, 2013.

Office Action dated Apr. 8, 2015, U.S. Appl. No. 14/169,046, filed Jan. 30, 2014.

Final Office Action dated Sep. 25, 2015, U.S. Appl. No. 14/169,046, filed Jan. 30, 2014.

First Action Interview Office Action dated Jul. 24, 2015, U.S. Appl. No. 14/135,574, filed Dec. 19, 2013.

\* cited by examiner

WIRELESS NETWORK PERFORMANCE ANALYSIS SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cellular wireless communication networks provide nearly ubiquitous connectivity for mobile devices such as mobile phones, personal digital assistants, and wireless enabled laptop computers. To provide radio links to mobile devices, cellular network operators build and maintain a large number of cell towers or cell sites. For example, a large wireless network providing national coverage may comprise more than 50,000 cell sites. The quality of cellular communication service provided by cell sites depends on a number of different factors such as the number of subscribers in a coverage area of the cell site, the radio signal strength of the cell site, and the local environment including foliage. Because these factors change over time as seasons change and as population distributions change, it is a challenge for cellular network operators to evaluate the performance of their network and the quality of service provided to their customers.

SUMMARY

In an embodiment, a system for managing a cellular wireless communication network is disclosed. The system comprises a cellular wireless communication performance data store, wherein the data store comprises cellular wireless communication performance metrics, wherein the performance metrics are segmented according to base transceiver stations. The system also comprises a computer and an application that is stored in a non-transitory memory of the computer. When executed by the computer, the application receives a selection of a plurality of base transceiver stations, retrieves metrics associated with the plurality of selected base transceiver stations from the cellular wireless communication performance data store, analyzes the metrics associated with the plurality of selected base transceiver stations, and identifies a low usage base transceiver station that is one of the plurality of selected base transceiver stations, wherein the low usage base transceiver station is associated with a usage that is less than a predefined usage threshold. The application further determines an average of an at least one metric based on the metrics of the plurality of selected base transceiver stations excluding the low usage base transceiver station, builds a presentation of the at least one metric against a time line and at least one of a weather event, a sports event, a public event, and an upgrade installation aligned to the same time line, and transmits the presentation, whereby a user may view the presentation in a display.

In an embodiment, a method of managing a cellular wireless communication network is disclosed. The method comprises providing a map of a portion of a cellular wireless communication network, wherein the map provides identification of base transceiver stations, receiving a designation of a geographical area, where the geographical area is located within the map, identifying a plurality of base transceiver stations located within the designated geographical area, accessing performance metrics associated with the identified base transceiver stations from a data store of metrics associated with the cellular wireless communication network, and analyzing the performance metrics of the identified base transceiver stations. The method further comprises presenting an average performance metric of the identified base transceiver stations based on the analyzing. determining an average performance metric of the identified base transceiver stations based on the analyzing, building a presentation of the average performance metric against a time line and at least one of a weather event, a sports event, a public event, or an upgrade installation aligned to the same time line, and transmitting the presentation, whereby a user may view the presentation in a display.

In an embodiment, a method of managing a cellular wireless communication network is disclosed. The method comprises determining an average wireless performance over a market portion of the cellular wireless communication network, selecting a plurality of base transceiver stations located within the market portion of the cellular wireless communication network, wherein the selected plurality of base transceiver stations comprise less than about one third of the base transceiver stations in the market portion of the cellular wireless communication network, determining an average wireless performance over the selected base transceiver stations, presenting the average wireless performance over the market portion of the cellular wireless communication network and the average wireless performance over the selected base transceiver stations against a time line, and presenting at least one of a weather event, a sports event, a public event, and an upgrade installation aligned to the same time line.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for analyzing and presenting cellular communication network performance metrics and for ranking a plurality of market segments of the network relative to each other is taught herein. The system may take performance data out of isolated, possibly obscure or siloed locations and promotes sharing and presenting the data in a useful format among a large number of wireless service provider employees. The information may be used by customer service representatives to answer a customer question in real-time and to communicate effectively with the customer about their wireless communication experience. The information may promote the customer care representative being able to tell the customer what their communication experience will be on the day of his or her call and predict what the customer's communication experience will be tomorrow and the next day. The system may promote a market manager determining at a glance how his market segment of the cellular communication network performs relative to the performance of the market segments of his or her peer market managers.

The system promotes selecting cell sites, determining an aggregate performance metric over the selected cell sites, and comparing the aggregate performance metric over the selected cell sites with a baseline performance metric. For example, cell sites that most often serve a service subscriber may be selected, an aggregate performance metric may be determined for those selected cell sites, and this aggregate performance metric may be compared to a baseline performance metric, for example an aggregate performance metric determined for a market segment of the cellular network.

The performance of a cell site, for example a base transceiver station (BTS), may be characterized using metrics such as a rate of dropped calls, a rate of blocked calls, a rate of evolution data only (EV-DO) failure, a rate of EV-DO dropped calls, a number of network fault alarms, a number of calls to customer care per 1000 subscribers, a number of trouble tickets, and other performance indicators. The performance metrics for a cell site may be determined for each of a plurality of radio sectors of the cell site, for example for each of three different sectors. A cell site summary metric may be calculated as a weighted sum of the several individual metrics and/or of the several individual metrics of each of the different sectors of the cell site. For example, each metric may be multiplied by a predefined weighting factor or weighting coefficient and these products summed to determine the cell site summary metric. Alternatively, some other way of determining the cell site summary metric may be employed. In an embodiment, the cell site summary metric may be constrained to a defined range of values, for example from 0 to 1, from 0 to 10, from 1 to 10, or some other range of values. The cell site summary metric may take any valid value in the range of values, either integer values or non-integer values.

A market performance metric may be calculated based on the cell site performance metrics of the cell sites located within the subject market. The market performance metric may be determined as the sum of each of the cell site performance metrics divided by the number of cell sites located within the subject market, for example an average value of the cell site performance metrics. Alternatively the market performance metric may be determined as the mean of each of the cell site performance metrics. In an embodiment, cell site summary metrics that are deemed unrepresentative of the market may be excluded from the determination of the market performance metric. For example, cell site summary metrics that are deemed to have outlier values may be excluded. As another example, cell site summary metrics associated with a cell site that has only recently been commissioned and may not yet be calibrated or adjusted may be excluded from the determination of the market performance metric. The market performance metric may comprise additional performance related information, for example customer care calls per one thousand subscribers, a number of trouble tickets per one thousand subscribers, or other performance related information.

The performance metrics of individual cell sectors, the performance metrics of cell sites, and the performance metrics of markets may be determined periodically, for example daily, weekly, or on some other periodic interval. The performance metrics may be displayed and compared in a variety of ways. Performance metrics of a cell sector may be compared with the performance metrics of the cell site or the performance metrics of the market in which the cell sector is located. The performance metrics of a selection of cell sites may be averaged and the averaged metrics of the selection of cell sites may be compared to the averaged performance metrics of a market. The metrics being compared may be presented as two dimensional plot of metrics versus time, to promote appreciating how the metrics may change over time. Scheduled events that may impact performance, for example a professional sports event, may be displayed with the plot of metrics and may cast light on why performance metrics experienced a transient but significant degradation. Other information may likewise by presented aligned to the same time line, for example weather event information, upgrade information, and other information.

The market performance metric may be used to order or rank each of the markets of a wireless cellular communication network, for example a national network. In an embodiment, the number of markets may be 10 or more. In an embodiment, the number of markets may be 25 or more. In an embodiment, the number of markets may be 50 or more. In another embodiment, the number of markets may be 75 or more. In another embodiment, the number of markets may be 90 or more. The market performance metrics may be used to compare the success of stake holders and/or market managers. The market performance metrics may be used to compare the efficiency of deployment of capital budgets by different market managers. The market performance metrics may be used to identify markets that should be budgeted additional capital for infrastructure improvements, for example cell site upgrades and/or construction of new cell sites.

The system provides an interface or front-end for interacting with the performance metrics in a variety of different ways. For example, when a customer calls in to a care center to inquire about their cellular service, a care representative can request that the system determine and/or present the metrics associated with the cell site proximate to the customer's home, the cell site proximate to the customer's workplace, and/or a plurality of cell sites in a geographical area that the customer most commonly inhabits. In an embodiment, the subject cell sites may be presented in a map view that features the different radio sectors of the cell sites. The map view may promote rapidly identifying a cell sector failure as a culprit in a sudden degradation of the wireless communication experienced by a customer. The map view may promote drilling down and discovering that a trouble ticket has been opened on the failed radio sector and that a work order has been issued to replace failed radio sector equipment within the day. Because the customer care representative is easily able to drill down and see trouble tickets associated to network resources, duplication of trouble tickets or opening of duplicate trouble tickets may be avoided.

The system can aggregate the metrics associated with the selected cell sites and compare them to the market performance metric of the market that most closely covers the selected cell sites. The care representative may then be able to tell the customer that the cellular coverage they should be experiencing is above average for the market and that a coverage problem may be due to the mobile device used by the customer. Alternatively, the care representative may say that the selected cell site performance metrics are worse than average but that a cell site enhancement is planned for the subject cell site in the next month. The system may provide for excluding some cell sites from the designated area based on exceptions associated with the cell sites. For example, the cell sites may support very little traffic most of the time but be heavily loaded during Sunday mornings due to church services in a large church in the coverage area of the cell site. The system may access a schedule data store to promote determining if special events such as professional sports events or other events are responsible for unusual cell site performance metrics.

The front-end of the system promotes a user inputting a threshold usage level and determining metrics based only over cell sites whose usage level meets or exceeds the threshold usage level. This function may be referred to as a slider. This function promotes making apples-to-apples type of comparisons or seeing how different cell sites and/or different markets perform under stressed and/or loaded conditions.

Figure 1:
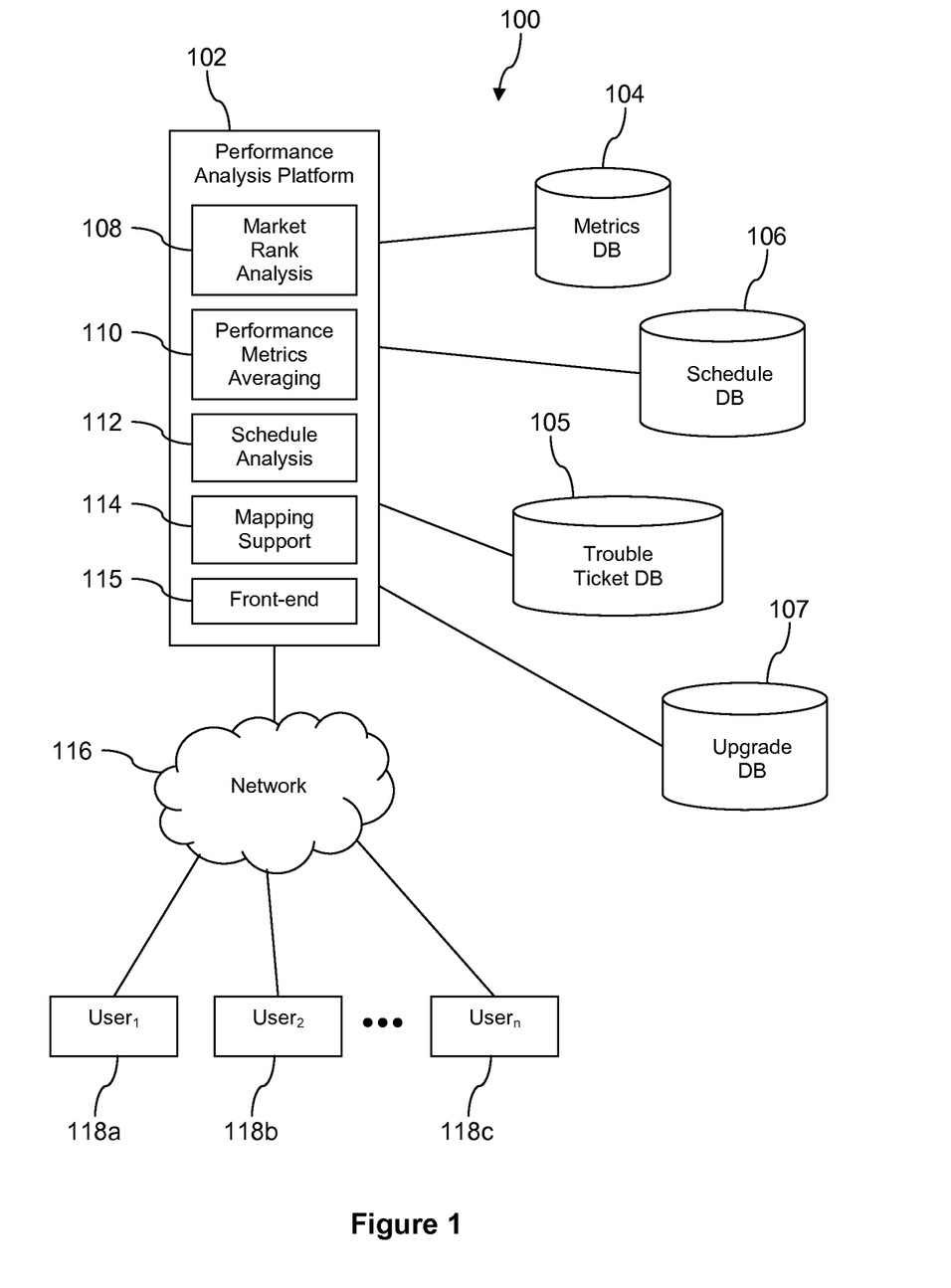
FIG. 1 is a block diagram of a system according to an embodiment of the disclosure.

Turning now to FIG. 1, a system 100 is described. In an embodiment, system 100 comprises a performance analysis platform 102, a metrics data store 104, a trouble ticket data store 105, a schedule data store 106, and an upgrade data store 107. The performance analysis platform 102 may be a computer system that executes one or more applications for cellular network communication performance metrics. In an embodiment, the performance analysis platform 102 may execute a market rank analysis component 108, a performance metrics average component 110, a schedule analysis component 112, a mapping support component 114, and a front-end 115. One skilled in the art will appreciate that the functionality provided by the components 108, 110, 112, 114, 115 may be combined into fewer components or partitioned among more components.

The system 100 further comprises a network 116 and a plurality of users 118. The network 116 comprises one or more private networks, one or more public networks, or a combination thereof. While the data stores 104, 105, 106, 107 are illustrated in FIG. 1 as directly coupled to the performance analysis platform 102, it is understood that the data stores 104, 105, 106, 107 may be coupled to the analysis platform 102 via the network 116.

The users 118 interact with the performance analysis platform 102 via the front-end 115. The users 118 may be computers such as personal computers, laptop computers, notebook computers, tablet computers, or other computers. The users 118 may represent web interfaces provided by the front-end 115 and accessed from computers, for example from web browsers executing on workstations, desktop computers, laptop computers, tablet computers, and the like. Different users 118 may be accorded different levels of access to the performance analysis functionality and/or performance metrics by the performance analysis platform 102 and/or the front-end 115 based on a user class, as described more fully below. Computers are discussed in more detail hereinafter.

The performance analysis platform 102 may be employed to analyze and visualize the performance of a cellular wireless communication network at a variety of different levels of granularity, for example by using the front-end 115 of the performance analysis platform 102. The cellular wireless communication network may comprise a large number of cell sites and/or base transceiver stations, for example more than 20,000 cell sites or more than 50,000 cell sites. The cellular wireless communication network may further comprise wired network resources such as mobile switches, home location register (HLR) servers, visitor location register (VLR) servers, media gateways, and other network nodes in a wired network that provide the network infrastructure to connect the mobile devices of subscribers to other mobile devices, other telephones, or to the Internet. The cell sites may provide radio communication links to mobile devices using one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an iDEN wireless protocol.

The metrics data store 104 may comprise a variety of data and/or metrics on radio sectors of cell sites and/or cell sites. For example, data and/or metrics about call drops, call blocks, network faults, evolution data only (EV-DO) drops, and other cell site performance related metrics may be stored in the metrics data store 104. Some of the data and/or metrics about call drops and call blocks may be provided by probes stationed in the serving areas of cell towers. As known by one of ordinary skill in the art, a probe may be similar to a mobile phone and may attempt to originate calls. Unlike a mobile phone, the probe is operated automatically, collects metrics on blocks and drops, and provides this data back to the metrics data store 104 or other node in the service provider's network. Data collected from real mobile devices and data from probes may be distinguished and may promote presenting data associated with real mobile devices separately from data associated with probes.

The metrics data store 104 may comprise data and/or metrics about data communication activities and data and/or metrics about voice communication activities. The metrics data store 104 may comprise data and/or metrics about short message service (SMS) communication activities. The metrics data store 104 may comprise data about how many voice calls or data sessions are handled by a base transceiver station or cell tower during different units of time, for example numbers of calls or sessions per hour, per day, per week, and/or per other unit of time. The metrics data store 104 may receive data and/or metrics updates, for example count updates, on a regular basis.

The metrics data store 104 may store both raw counts of call drops, call blocks, network faults, and EV-DO drops as well as performance metrics derived from or calculated based on the raw counts. The raw counts may be periodically processed to derive call drop rates, call block rates, EV-DO drop rates, EV-DO call failure rates, network fault alarm rates, and other rate based performance metrics. Alternatively, the raw counts may be processed when an accumulation of unprocessed raw counts exceeds a predetermined threshold. In an embodiment, the metrics may be determined at the cell sites and/or at a server in the wireless service provider network and written into the metrics data store 104 periodically or aperiodically. At least some of the rate based performance metrics may be determined as a percentage of opportunities, for example as a percentage of all calls attempted and/or as a percentage of all calls connected. The raw counts and the rate based performance metrics may be linked to or associated to a radio sector and/or cell site identity and a market identity.

In an embodiment, some rate based performance metrics may be determined by processing all counts accumulated over an hour, a day, a week, a month, or some other interval of time. Some counts may be processed to form per unit of time derived metrics for a plurality of different time units. For example, a raw data may be processed to derive each of a per hour count, a per day count, and a per week count. Some counts may be excluded from rate based performance metric calculations, for example counts accumulated on Mother's Day and/or holidays may be excluded as being non-representative of performance. Thus, there may be a single dropped call rate, a single blocked call rate, a single EV-DO dropped call rate, and a single network fault alarms rate associated with each radio sector of a cell site and/or cell site. In an embodiment, the rate based performance metrics may be determined based on counts that accumulate during a peak usage period of time, for example during a weekday busy hour. In an embodiment, some rate based performance metrics may be determined for each of a plurality of different time periods. For example, a different blocked call rate may be determined for each of a morning period, an afternoon period, an evening period, and a late night period. For example, a blocked call rate may be determined for each hour of the day. In an embodiment, a blocked call rate may be determined for weekends and a separate blocked call rate may be determined for weekdays. The rate based performance metrics may be determined or calculated periodically over the most recent time window. Alternatively, the rate based performance metrics may be determined or calculated after a predefined number of counts accumulate.

The metrics data store 104 may contain information about cell site enhancements or capacity upgrades associated with the cell sites. The enhancements and/or capacity upgrades may be entered into the metrics data store 104 up to two years before the commissioning of the upgrades. In an embodiment, the information about cell site enhancements and/or capacity upgrades may be stored in another data store or accessed by the performance analysis platform 102 from another source. For example, the information about cell site enhancements, capacity upgrades, and other infrastructure improvements may be stored in the upgrade data store 107. Upgrades or enhancements may include capacity upgrades of a wired communication link between the cell site and a wired network, for example the public switched telephone network.

The performance analysis platform 102 analyzes, processes, and summarizes a variety of information related to performance of the cellular wireless communication network. The performance analysis platform 102 promotes a range of analysis granularity to users 118 examining cellular performance. The user 118 may take a network wide view across all markets. The user 118 may take a market wide view of performance averaged across the subject market. The user 118 may take an area view of performance averaged across a plurality of selected cell sites. The user 118 may take a view of performance of a single cell site or of a single radio sector of a cell site. The user 118 may compare the selected view to any other level of granularity to promote comparisons. The user 118 may view the data and or information provided by the performance analysis platform 102 at different levels of time granularity, for example to see metrics represented on a per hour of time basis, on a per day time basis, on a per week time basis or another time basis. The data may be displayed on a time line to the user and information in addition to metrics may also be presented aligned with the same time basis, for example notable events that may be recorded in the schedule data store 106 such as a major sporting event and/or installation of upgrades to service.

The market rank analysis component 108 determines a summary performance metric for each of a plurality of markets into which a cellular wireless network is conceptually partitioned. The summary performance metric may be determined based on averages of the different cell site performance metrics, for example an average of the call drop rate, an average of the call block rate, an average of the EV-DO drop rate, and an average of the network fault rate across the cell sites of the subject market. It will be appreciated that this list is exemplary, and the summary performance metric may be based on additional metrics, for example a number of customer care calls associated with a market or a number of customer care calls per 1000 subscribers associated with a market. The summary metric may be based on a number of trouble tickets opened that are associated with a market, for example trouble tickets stored in the trouble ticket data store 105. The summary performance metric may take account of short message service lost or undelivered messages.

In an embodiment, the summary performance metric of each market may be determined as a weighted sum of the several averages. For example, the summary performance metric may be determined by multiplying each of the averages by a separate weighting or coefficient and then summing these products. The metrics associated with some of the cell sites of a market may be excluded from the calculation of a summary performance metric for a market because the subject cell sites may be considered unrepresentative in some way. For example, the cell site may not have been in service long enough to be fully adjusted. For example, the cell site may have an anomalous loading pattern, for example lightly loaded except on Sunday mornings when church services are held in a large church within the coverage area of the subject cell site.

The market rank analysis component 108 may depend upon or invoke services provided by the performance metrics averaging component 110 to determine the averages of the cell site metrics across a market. The performance metrics averaging component 110 may depend upon or invoke services provided by the schedule analysis component 112 to exclude some atypical metrics from determination of averages. For example, the schedule analysis component 112, based on accessing the schedule data store 106, may indicate that a professional football game was played between noon and 3 PM on a particular Sunday, and the performance metrics averaging component 112 may use this information to exclude metrics associated with a cell site close to the football stadium between 8 AM and 6 PM from calculations of average performance metrics for the subject cell site. The schedule data store 106 may contain information on public events such as professional sports events, college sports events, graduation ceremonies, public fireworks displays, as well as other public events. The performance metrics averaging component 110 or another component of the performance analysis platform 102 may determine the rate based performance metrics of the cell sites.

The mapping support component 114 provides mapping functionality to promote presenting a map of the cellular wireless network at different levels of granularity. In an embodiment, the mapping support component 114 promotes viewing the complete cellular wireless network as a map overlaying market boundaries over a geographical map of the United States and zooming down to a series of finer degrees of granularity. For example, from a national level view that shows metrics or data associated with all markets the map may be zoomed to show data and/or metrics associated with a selected market at a more fine grained level of detail. From the market level view the map may be zoomed to show data and/or metrics associated with a selected area of the selected market at a more fine grained level of detail. At each level of map granularity or map detail appropriate views of performance metrics can be presented. For example, at the top level view, the rank of each market may be presented within the boundaries of the markets. In an embodiment, other information may be presented within the boundaries of the markets, for example statistics on numbers of subscribers, numbers of completed calls per month, average performance metrics, average performance metrics for the market expressed related to a national average performance metrics, and/or other performance information.

The mapping support component 114 allows a user 118 to select one or more cell sites by designating an area and/or by excluding some cell sites. The performance metrics averaging tool 110 may then be invoked to determine performance metric averages over the selected cell sites and relate these and/or compare these performance metric averages to the corresponding performance metric averages for the subject market and/or for the entire wireless cellular network. The user 118 may designate an area and exclude some cell sites to approximate an area frequented by a customer, for example an area encompassing the customer's residence, the customer's workplace, and a commute path between residence and workplace. The mapping support component 114 may be used along with the performance metrics averaging component 110, for example invoked by the front-end component 115, to determine one or more average performance metrics for the customer and compare these average performance metrics with corresponding average performance metrics for the market and/or for the national average performance metrics.

The performance analysis platform 102 may promote different classes of access to the different users 118. For example, a first user 118a may be a market manager, and the performance analysis platform 102 may grant unlimited access to all levels of metrics and analysis functionality to the first user 118a. A second user 118b may be a customer care representative at a care center providing services to one or a small number of markets. The performance analysis platform 102 may limit the second user 118b to accessing the market or markets associated to his or her care center and possibly executing a restricted set of analysis functionality. A third user 118c may be a contractor providing services related to turning up an enhancement of a cell site. The performance analysis platform 102 may restrict access of the third user 118c to only the metrics of the subject cell site or to the metrics of the subject cell site and average metrics with the market within which the subject cell site is located but not performance metrics associated with other cell sites with in the market. In an embodiment, the performance analysis platform 102 may promote any number of different user classes and may restrict access of users 118 to metrics and/or functionality based on the user class of the subject user 118. In an embodiment, the front-end component 115 may perform the access restriction based on class filtering described above.

The performance metrics may be presented on a time line that promotes readily seeing how the metrics change over time, for example how the metrics change throughout a day or for example over a longer period of several months. Other useful information may likewise be presented aligned with the same time line, for example major events such as sporting events, fireworks displays, and the like. Information about planned upgrades may be displayed along the same time line. Information about weather events may be displayed along the same time line. The presentation of this wealth of information may promote a more holistic understanding of the performance metrics and what factors may be influencing those performance metrics. This information may be helpful to a customer care representative, for example, who is speaking to a customer about wireless service problems experienced by the customer.

Figure 2:
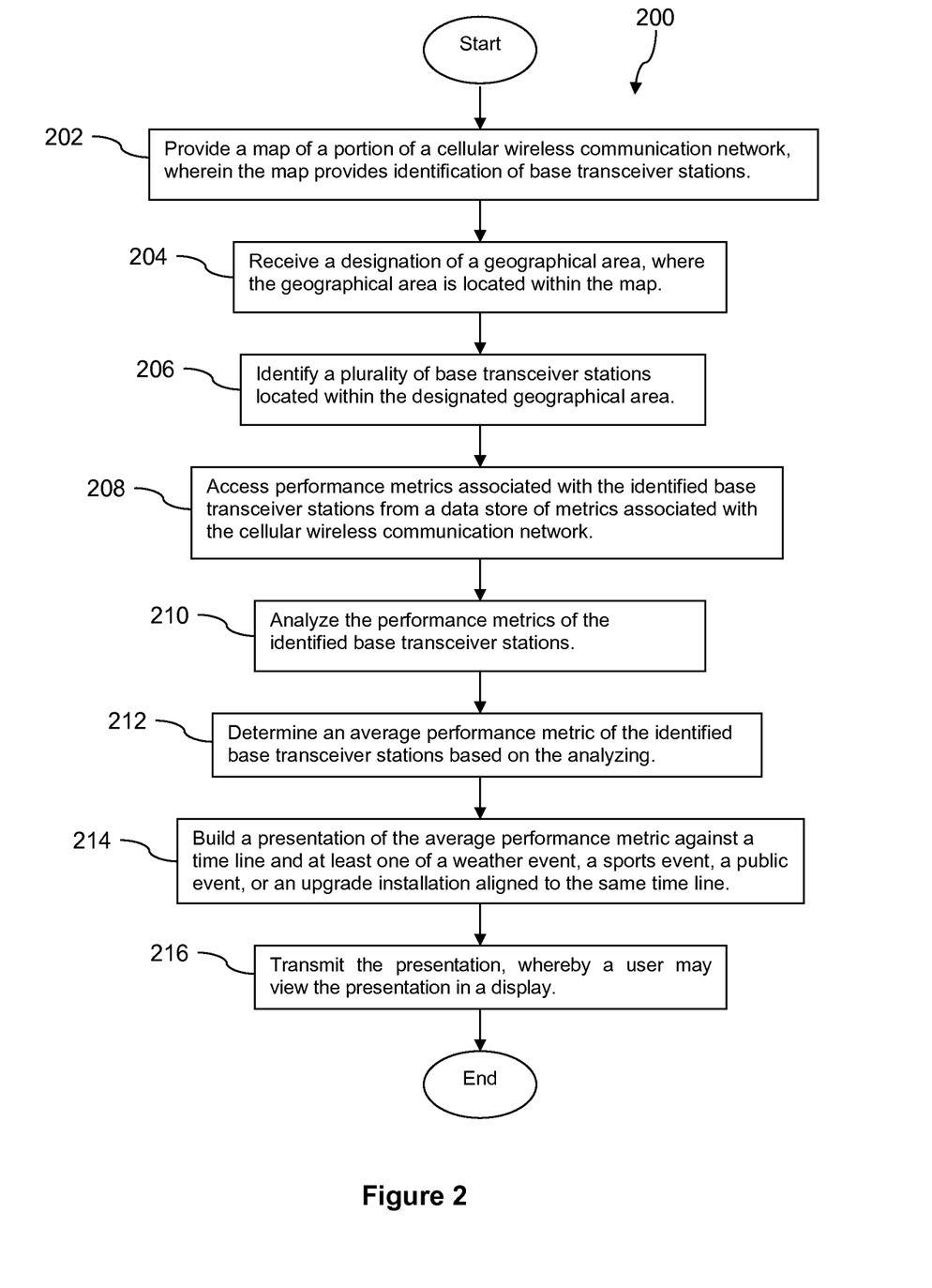
FIG. 2 is a flow chart of a method according to an embodiment of the disclosure.

Turning now to FIG. 2, a method 200 is described. At block 202, provide a map of a portion of a cellular wireless communication network, wherein the map provides identification of base transceiver stations. At block 204, receive a designation of a geographical area, where the geographical area is located within the map. At block 206, identify a plurality of base transceiver stations located within the designated geographical area. At block 208, access performance metrics associated with the identified base transceiver stations from a data store of metrics associated with the cellular wireless communication network. At block 210, analyze the performance metrics of the identified base transceiver stations. At block 212, determine an average performance metric of the identified base transceiver stations based on the analyzing. At block 214, build a presentation of the average performance metric against a time line and at least one of a weather event, a sports event, a public event, or an upgrade installation aligned to the same time line. At block 216, transmit the presentation, whereby a user may view the presentation in a display. It will be appreciated that the user may use the presented information to make management decisions, for example to defer upgrading a first base transceiver station and advancing an upgrade of a second base transceiver station based on the information.

Figure 3:
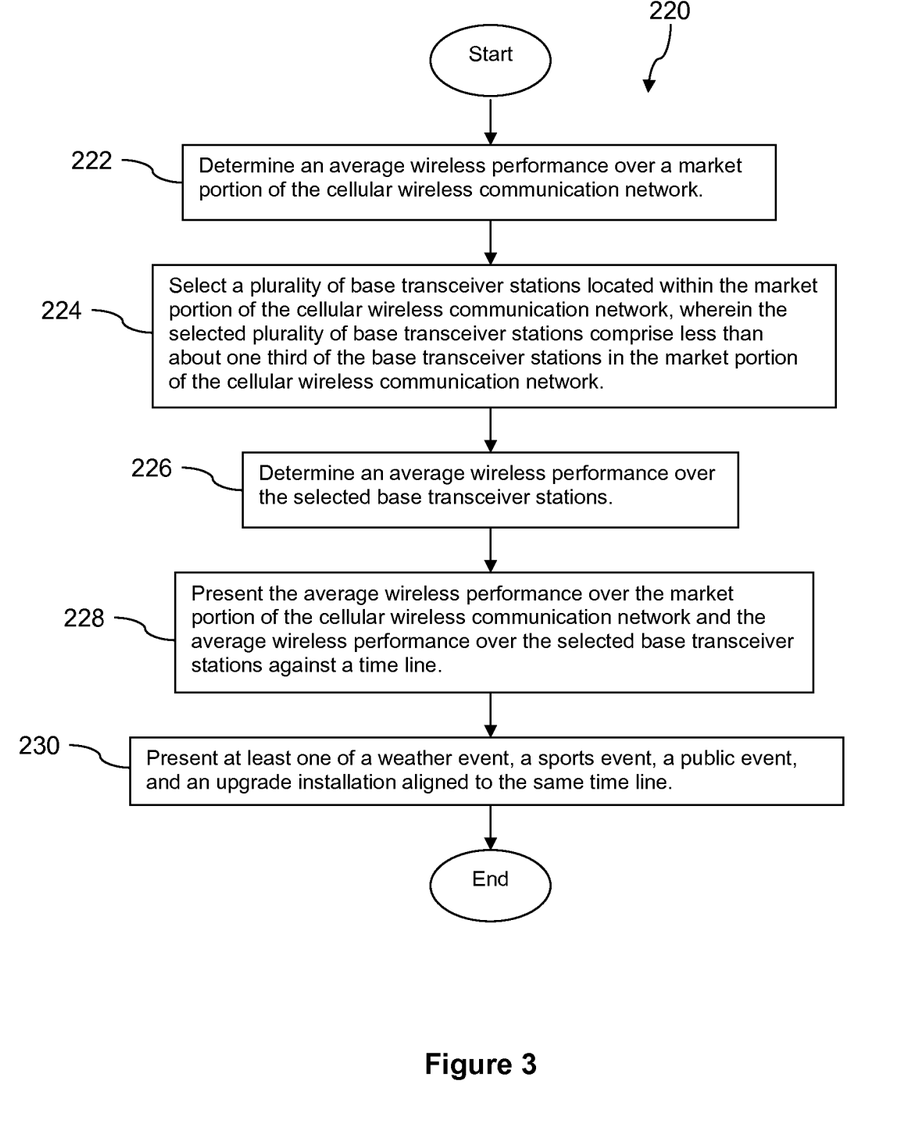
FIG. 3 is a flow chart of another method according to an embodiment of the disclosure.

Turning now to FIG. 3, a method 220 is described. At block 222, determine an average wireless performance over a market portion of the cellular wireless communication network. At block 224, select a plurality of base transceiver stations located within the market portion of the cellular wireless communication network, wherein the selected plurality of base transceiver stations comprise less than about one third of the base transceiver stations in the market portion of the cellular wireless communication network. At block 226, determine an average wireless performance over the selected base transceiver stations. At block 228, present the average wireless performance over the market portion of the cellular wireless communication network and the average wireless performance over the selected base transceiver stations against a time line. At block 230, present at least one of a weather event, a sports event, a public event, and an upgrade installation aligned to the same time line.

Figure 4:
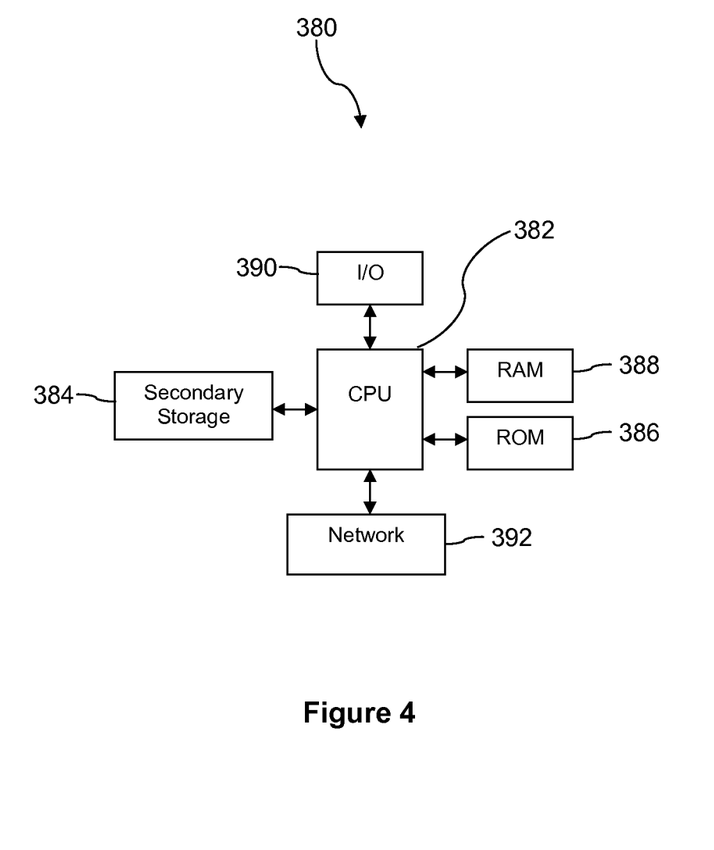
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), iDEN, and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for maintaining operational performance of a cellular wireless communication network, comprising:
 a cellular wireless communication performance data store, wherein the data store comprises a plurality of cellular wireless communication performance metrics, and wherein the plurality of metrics are segmented according to base transceiver stations;
 a computer; and
 an application stored in a non-transitory memory coupled to the computer that, upon execution by at least one processor of the computer, configures at least one processor to:
  receive a selection of a plurality of base transceiver stations of the cellular wireless communication network from a front-end component that corresponds with a user class,
  retrieve the plurality of metrics associated with the plurality of selected base transceiver stations from the cellular wireless communication performance data store based on the user class of the front-end component, wherein the plurality of metrics includes usage,
  analyze the plurality of metrics associated with the plurality of selected base transceiver stations,
  identify a low usage base transceiver station that is one of the plurality of selected base transceiver stations based on usage, wherein the low usage base transceiver station is associated with usage that is less than a predefined usage threshold,
  responsive to identification of the low usage base transceiver station, determine an average of at least one metric based on the plurality of metrics associated with the plurality of selected base transceiver stations excluding the low usage base transceiver station, wherein the at least one metric is different from usage,
  correlate the at least one metric with at least one previously occurred event along a time line, wherein the at least one previously occurred event comprises at least one of a weather event, a sports event, and a public event,
  based on the correlation, associate a portion of the at least one metric with the at least one previously occurred event over a defined time period along the time line,
  exclude, from the determined average, the portion of the at least one metric that is associated with the previously occurred event based on the correlation to determine a modified average of the at least one metric,
  build a presentation of the at least one metric, the modified average of the at least one metric, and the at least one previously occurred event that are aligned against the timeline, and
  transmit the presentation to the front-end component, wherein the presentation configures a display of the front-end component.

2. The system of claim 1, further comprising the front-end component that communicatively couples with the cellular wireless communication network, and an events data store that comprises the defined time period for the at least one previously occurred event.

3. The system of claim 1, wherein at least some of the plurality of metrics in the cellular wireless communication performance data store are associated with one of at least 50 wireless communication service markets within the cellular wireless communication network.

4. The system of claim 3, wherein the application, upon execution by the processor, further configures at least one processor to:
 determine a relative rank of each of the plurality of wireless communication service markets based on the plurality of cellular wireless communication performance metrics, and
 present the relative rank of each market on the display responsive to an analysis of the user-class.

5. The system of claim 1, wherein the plurality of cellular wireless communication performance metrics comprise call drop rates, call block rates, evolution data only (EV-DO) failure rates, and network fault alarms.

6. The system of claim 5, wherein the call drop rates and the call block rates are represented as a percentage relative to call attempts.

7. The system of claim 5, wherein the network fault alarms are normalized based on a predefined number of subscribers.

8. A method of maintaining operational performance of a cellular wireless communication network, comprising:
 providing, to a processor of a front-end component, a map of a portion of the cellular wireless communication network to a display of the front-end component, wherein the map provides identification of base transceiver stations of the cellular wireless communication network;

receiving, on a server of the cellular wireless communication network from the front-end component corresponding with a user class, a designation of a geographical area based on the provided map, wherein the designated geographical area is located within the provided map;

identifying, by a processor of the server, a plurality of base transceiver stations located within the designated geographical area based on the user class of the front-end component;

accessing, by a processor of the server, a plurality of base transceiver station performance metrics from a data store based on the user class of the front-end component, wherein the plurality of base transceiver station performance metrics are associated with the identified base transceiver stations located within the designated geographical area and associated with the cellular wireless communication network;

analyzing, by a processor of the server, the plurality of base transceiver station performance metrics, wherein the plurality of metrics include usage;

identifying a low usage base transceiver station that is one of the plurality of base transceiver stations based on usage, wherein the low usage base transceiver station is associated with usage that is less than a predefined usage threshold;

responsive to the identifying the low usage base transceiver station, determining, by a processor of the server, an average of at least one base transceiver station performance metric based on the plurality of base transceiver station performance metrics excluding the low usage base transceiver station, wherein the at least one metric is different from usage;

correlating, by a processor of the server, the average base transceiver station performance metric with a previously occurred event along a time line, wherein the previously occurred event comprises at least one of a weather event, a sports event, and a public event;

based on the correlating, associating, by a processor of the server, a portion of the average base transceiver station performance metric with the previously occurred event over a defined time period along the time line;

excluding from the determined average, by a processor of the server, the portion of the base transceiver performance metric that is associated with the previously occurred event based on the correlation to determine a modified average of the base transceiver performance metric;

building, by a processor of the server, a presentation of the average base transceiver station performance metric, the modified average of the base transceiver station performance metric, and the previously occurred event that are aligned against the timeline; and transmitting the presentation to the front-end component, wherein the presentation configures the display of the front-end component.

9. The method of claim 8, wherein the plurality of base transceiver station performance metrics comprise statistics of short message service (SMS) communication.

10. The method of claim 8, wherein the plurality of base transceiver station performance metrics comprise a blocked call rate and a dropped call rate.

11. The method of claim 8, further comprising receiving a threshold base transceiver station usage level, wherein identifying the plurality of base transceiver stations further comprises excluding each base transceiver station within the designated geographical area that has a usage level that falls below the threshold base transceiver station usage level.

12. The method of claim 8, further comprising:
determining, by a processor, a market average performance metric that is based on the base transceiver stations within a market area and the user class, wherein the market area comprises the designated geographical area and an area that encompasses the designated geographical area; and adding, to the presentation, the market average performance metric along the time line of the presentation.

13. The method of claim 8, wherein the cellular wireless communication network promotes radio communication based on at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an iDEN wireless protocol.

14. A method of maintaining operational performance of a cellular wireless communication network, comprising:
determining, by a processor of a server of the cellular wireless communication network, a market portion average wireless performance metric based on a plurality of wireless performance metrics associated with base transceiver stations located over a market portion of the cellular wireless communication network and based on a user class of a front-end component, wherein the plurality of wireless performance metrics includes usage;

selecting, by a processor of the server, a plurality of base transceiver stations located within the market portion of the cellular wireless communication network that corresponds with the user class, wherein the selected plurality of base transceiver stations comprises less than one third of the base transceiver stations in the market portion of the cellular wireless communication network;

determining, by a processor of the server, an average wireless performance metric over the selected plurality of base transceiver stations based on at least one wireless performance metric associated with the selected plurality of base transceiver stations and based on the user class of the front-end component, wherein the average wireless performance metric excludes a low usage base transceiver station associated with usage that is less than a predefined usage threshold, and wherein the at least one wireless performance metric is different than usage;

identifying, by a processor of the server, at least one previously occurred event comprising at least one of a weather event, a sports event, and a public event;

determining, by a processor of the server, that one of the at least one previously occurred event is associated with a concentration of people that exceeds a predefined threshold;

associating, by a processor of the server, a portion of the at least one wireless performance metric associated with the selected plurality of base transceiver stations with the previously occurred event associated with the concentration of people that exceeds the predefined threshold, wherein the associated portion is aligned to a time line;

excluding from the determined average, by a processor of the server, the associated portion of each of the wireless performance metrics to determine a modified market portion average wireless performance metric and a modified average wireless performance metric over the selected plurality of base transceiver stations;

building, by a processor of the server, a presentation against the time line, wherein the presentation includes each of the modified wireless performance metrics and the at least one previously occurred event that is aligned to the same time line; and presenting, on a device display of the front-end component, the presentation against the time line.

15. The method of claim 14, wherein determining that one of the at least one previously occurred event is associated with the concentration of people that exceeds the predefined threshold comprises accessing a data store comprising a schedule of the one of the at least one previously occurred event.

16. The method of claim 14, wherein the one of the at least one previously occurred event associated with the concentration of people that exceeds the predefined threshold comprises at least one of professional sports events, college sports events, graduation ceremonies, and public fireworks displays.

17. The method of claim 14, wherein determining the market portion average wireless performance metric comprises:

selecting, from a data store, wireless performance metrics for base transceiver stations located among at least 50 different markets of the cellular wireless communication network based on the user class, and analyzing, by a processor, the selected wireless performance metrics for the base transceiver stations located among the at least 50 different markets.

18. The method of claim 17, further comprising:

determining a total market average wireless performance metric that is based on wireless performance metrics for base transceiver stations among all markets of the cellular wireless communication network and based on the user class; and adding the total market average wireless performance metric to the presentation along the time line.

19. The method of claim 14, wherein a wireless performance metric of a base station transceiver is determined based on a dropped call rate and a blocked call rate of the base station transceiver associated with the wireless performance metric.

* * * * *